(12) United States Patent
Biwa et al.

(10) Patent No.: US 9,014,569 B2
(45) Date of Patent: Apr. 21, 2015

(54) OPTICAL NODE AND OPTICAL COMMUNICATION METHOD

(75) Inventors: Koji Biwa, Kawasaki (JP); Kosuke Komaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 817 days.

(21) Appl. No.: 13/252,201

(22) Filed: Oct. 4, 2011

(65) Prior Publication Data

US 2012/0087669 A1    Apr. 12, 2012

(30) Foreign Application Priority Data

Oct. 7, 2010 (JP) ................................. 2010-227291

(51) Int. Cl.
*H04J 14/02* (2006.01)
*H04B 10/077* (2013.01)

(52) U.S. Cl.
CPC ........ *H04J 14/0221* (2013.01); *H04B 10/0773* (2013.01); *H04J 14/0276* (2013.01)

(58) Field of Classification Search
USPC ................................... 398/79, 181
See application file for complete search history.

(56) References Cited

U.S. PATENT DOCUMENTS

| | | | | |
|---|---|---|---|---|
| 6,236,499 | B1 * | 5/2001 | Berg et al. | 359/341.2 |
| 6,449,070 | B1 * | 9/2002 | Izumi | 398/79 |
| 8,620,160 | B2 * | 12/2013 | Onaka | 398/79 |
| 2003/0067649 | A1 * | 4/2003 | Suzuki et al. | 359/124 |
| 2003/0231379 | A1 * | 12/2003 | Komaki et al. | 359/337.4 |
| 2004/0161234 | A1 * | 8/2004 | Ozawa | 398/33 |
| 2005/0069248 | A1 * | 3/2005 | Jasti et al. | 385/24 |
| 2005/0213968 | A1 | 9/2005 | Uda et al. | |
| 2006/0018658 | A1 * | 1/2006 | Mori | 398/79 |
| 2006/0098990 | A1 * | 5/2006 | Claringburn | 398/193 |
| 2007/0109630 | A1 * | 5/2007 | Komaki et al. | 359/341.44 |
| 2007/0280688 | A1 * | 12/2007 | Shen | 398/59 |
| 2008/0080867 | A1 * | 4/2008 | Itoh et al. | 398/97 |
| 2009/0087185 | A1 * | 4/2009 | Uda et al. | 398/79 |
| 2009/0092391 | A1 * | 4/2009 | Zong et al. | 398/79 |
| 2009/0190205 | A1 * | 7/2009 | Onaka et al. | 359/334 |
| 2012/0063771 | A1 * | 3/2012 | Sugaya et al. | 398/26 |

FOREIGN PATENT DOCUMENTS

| | | |
|---|---|---|
| JP | 2002-185482 A | 6/2002 |
| JP | 2005-277842 A | 10/2005 |

OTHER PUBLICATIONS

Japanese Office Action issued May 27, 2014 for corresponding Japanese Patent Application No. 2010-227291, with Partial Translation, 5 pages.

* cited by examiner

*Primary Examiner* — David Payne
*Assistant Examiner* — Tanya Motsinger
(74) *Attorney, Agent, or Firm* — Fujitsu Patent Center

(57) ABSTRACT

In an optical node, a transmitter produces an optical supervisory signal for supervising an optical network, a processor is operative to control a power level of the optical supervisory signal according to a per-wavelength power level of an optical communication signal when the optical node has no post amplifiers, and a multiplexer combines the controlled optical supervisory signal with the optical communication signal to be transmitted to another optical node located downstream.

6 Claims, 10 Drawing Sheets

US 9,014,569 B2

OPTICAL NODE AND OPTICAL COMMUNICATION METHOD

CROSS-REFERENCE TO RELATED APPLICATION

This application is based upon and claims the benefit of priority of the prior Japanese Patent Application No. 2010-227291, filed on Oct. 7, 2010, the entire contents of which are incorporated herein by reference.

FIELD

The embodiments discussed herein relate to an optical node that transmits optical communication signals, as well as to an optical communication method therefor.

BACKGROUND

Optical transmission systems use Optical Supervisory Channel (OSC) for the purpose of controlling communication between optical nodes. For example, an optical node sends an OSC signal, combined with an optical communication signal carrying data channels, to a subsequent node located downstream. Typically, the receiving optical node amplifies the received optical communication signal up to a specified power level by using an optical amplifier at the front end (called pre-amplifier). The amplified optical communication signal is then subjected to an optical add-drop multiplexer (OADM) to drop some signals destined for a lower-level network and add some other signals from the lower-level network. The optical communication signal suffers a certain amount of attenuation during the course of this add and drop processing at the OADM. The optical node thus compensates for the signal attenuation by using another optical amplifier (called post-amplifier) to regain the specified power level before the signal is transmitted to the downstream optical node. The optical nodes having such OADM functions may be referred to as "OADM nodes" where appropriate in this description.

Some optical nodes in a network do not have post-amplifiers. For example, an in-line optical node (i.e., node without OADM capabilities) simply amplifies and forwards received optical communication signals to adjacent nodes, without adding or dropping any signals. The absence of OADM capabilities means that such nodes are free from the attenuation of optical communication signals due to add and drop processing and thus from the need for the attenuation compensation mentioned above. For this reason, in-line optical nodes use in-line amplifier units that include pre-amplifiers, but no post-amplifiers.

As an example of conventional techniques, there is proposed a communication method that provides high connectivity in an optical network (see, for example, Japanese Laid-open Patent Publication No. 2002-185482). The proposed technique offers a packet-switched optical ring network that combines the features of time division multiplexing and wavelength division multiplexing.

Under particular conditions, even OADM nodes are allowed to use in-line amplifier units and eliminate post-amplifiers. For example, this option may be applied in the case where the distance of the transmission line is so short that the optical transmission system can ensure the quality of optical communication signals without post-amplifiers. In this case, the OADM node using in-line amplifier units first amplifies a received optical communication signal with its pre-amplifier. The amplified signal then undergoes OADM processing and is transmitted as is (i.e., without post-amplification) to the next optical node.

The output power level of an OADM node using in-line amplifier units is lower than the output of an OADM node having a post-amplifier, because of the lack of additional amplification to recover the loss of power caused during add and drop processing in the OADM. In other words, the OADM node using in-line amplifier units produces an increased difference between the per-wavelength power level of an OADM-processed optical communication signal and the power level of an OSC signal transmitted together with the optical communication signal. To remove such an OSC signal from a received optical communication signal, the downstream optical node has to use, for example, a costly high-performance demultiplexing filter.

SUMMARY

According to an aspect of the invention, there is provided an optical node that includes a transmitter to produce an optical supervisory signal for supervising an optical network, a processor that is operative to control a power level of the optical supervisory signal according to a per-wavelength power level of an optical communication signal when the optical node has no post amplifiers, and a multiplexer to combine the controlled optical supervisory signal with the optical communication signal to be transmitted to another optical node located downstream.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
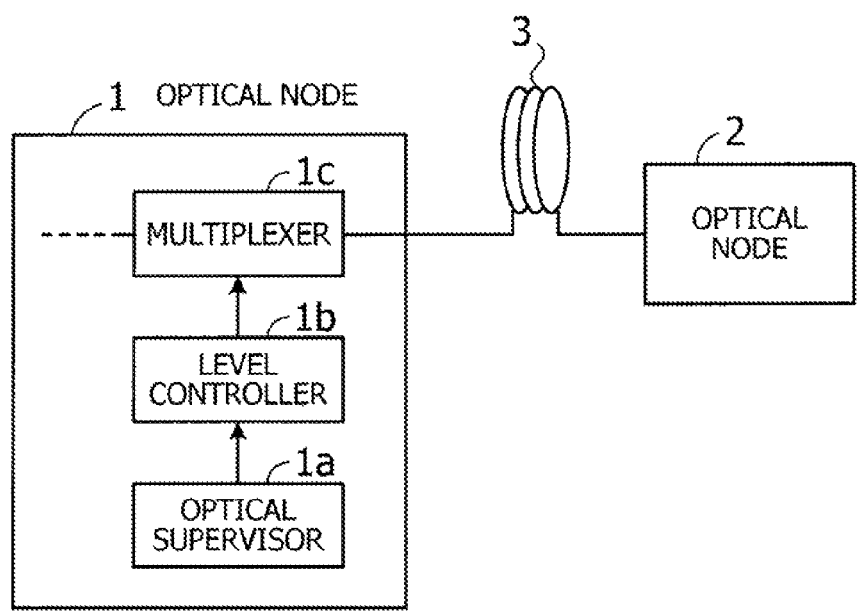
FIG. 1 illustrates an optical node according to a first embodiment.

A first embodiment will be described in detail below with reference to the accompanying drawings. FIG. 1 illustrates an optical node according to the first embodiment. Specifically, FIG. 1 illustrates two optical nodes 1 and 2 and an optical fiber 3, which constitute a portion of an optical network. The illustrated optical node 1 includes an optical supervisor 1a, a level controller 1b, and a multiplexer 1c.

The optical supervisor 1a produces an optical supervisory signal for transmission from the optical node to the next optical node 2 for the purpose of supervising the optical network. The optical supervisor includes a transmitter and a receiver. The transmitter may include a modulator that modulates an operatical signal and a laser diode. The receiver may include, for example, a photo detector. This optical supervisory signal may be, for example, an Optical Supervisory Channel (OSC) signal.

The level controller 1b controls the power level of the optical supervisory signal produced by the optical supervisor 1a. The multiplexer 1c combines (multiplexes) the optical supervisory signal from the level controller 1b with an optical communication signal to be transmitted to the optical node 2.

In operation, the optical node 1 controls the power level of an optical supervisory signal before it is transmitted together with an optical communication signal to the next optical node 2. The illustrated structure of the optical node 1 saves the receiving optical node 2 from increased costs by eliminating the need for high-performance demultiplexing filters to separate an optical supervisory signal from the received optical communication signal. In the case, for example, where the optical node 1 is an OADM node using in-line amplifier units, its internal OADM processing causes a reduction of the optical signal level per wavelength. This means that the optical supervisory signal has an increased difference from the optical communication signal in terms of their power levels. This increased difference of power levels makes it difficult for the receiving optical node 2 to separate the optical supervisory signal from the optical communication signal and thus necessitates the optical node 2 to employ a high-performance demultiplexing filter for sufficient separation. In the illustrated optical node 1, however, the level controller 1b controls an optical supervisor signal in such a way that its power level will be, for example, around the per-wavelength power level of the optical communication signal. The receiving optical node 2 can separate this optical supervisory signal from the optical communication signal by using an ordinary demultiplexing filter, instead of high-performance ones.

Conventionally, two different modules (described in detail later) are prepared as alternative building blocks of an optical node; one of the two modules is to be selected depending on which type of node to build, an in-line optical node or an OADM node using in-line amplifier units. The present embodiment eliminates the need for such two different modules since the proposed optical node 1 employs a level controller 1b to control the power level of supervisory signals.

Figure 2:
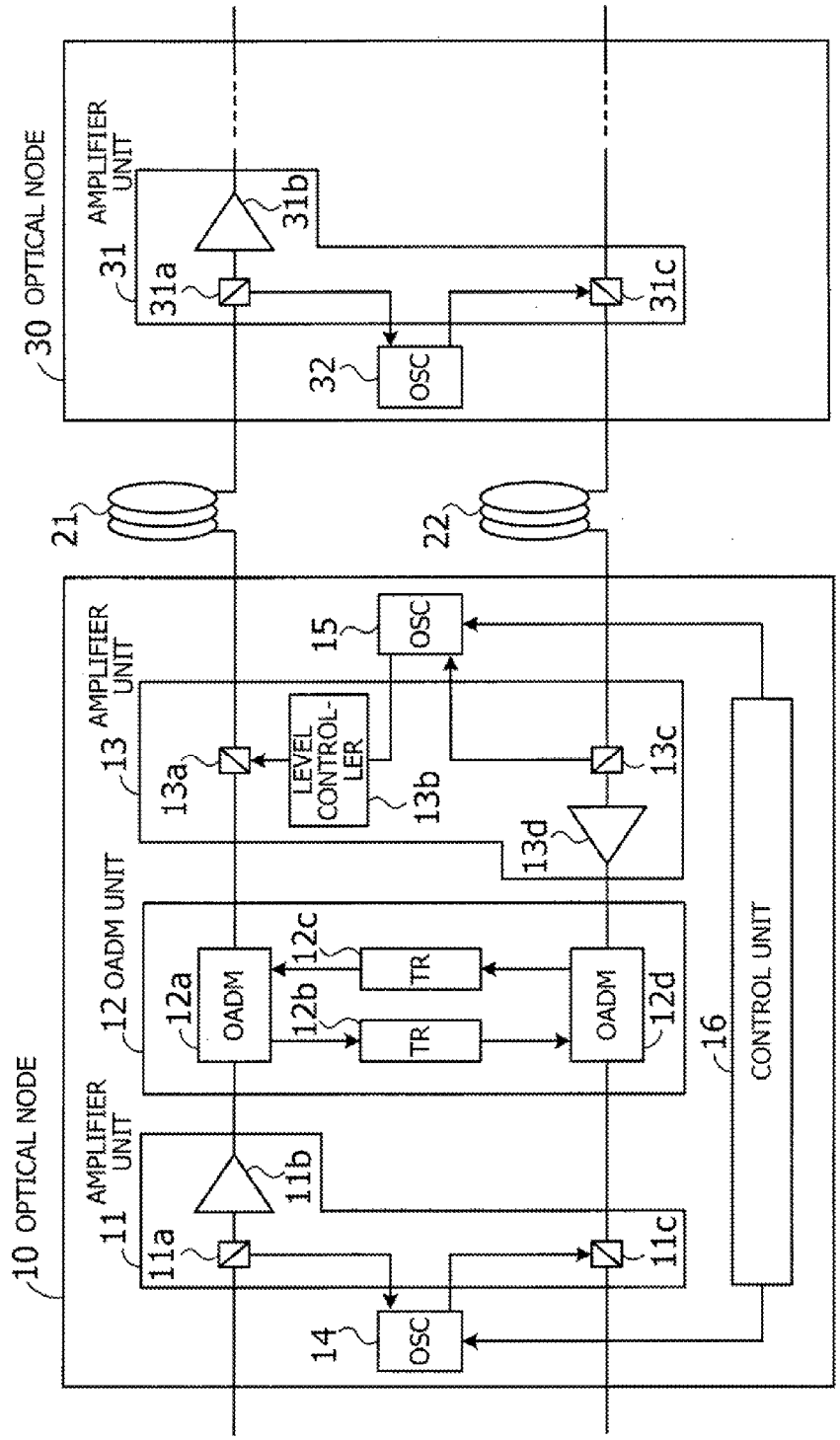
FIG. 2 illustrates an optical network including optical nodes according to a second embodiment.

A second embodiment will now be described in detail below with reference to the accompanying drawings. FIG. 2 illustrates an optical network including optical nodes according to the second embodiment. The illustrated optical network is formed from optical nodes 10 and 30 and optical fibers 21 and 22 connecting them. While not explicitly depicted in FIG. 2, the optical network actually has more such nodes and fiber-optic cables to constitute, for example, a ring network. Where appropriate, those optical nodes 10 and 30 and other non-depicted optical nodes are collectively referred to as "optical nodes."

Optical nodes exchange OSC signals with each other to supervise the optical network, besides forwarding optical communication signals to transport information. OSC signals convey, for example, an alarm from optical nodes, the number of wavelengths contained in an optical communication signal, and other information for management purposes. The optical node 10 places its own alarm information on an outgoing OSC signal, so that other optical nodes and network management device monitoring the optical network can be alerted. The optical node 10 also receives an OSC signal from its preceding node. From the received OSC signal, the optical node 10 recognizes how many wavelengths are contained in the incoming optical communication signal that the optical node 10 is receiving. The OSC signal has a wavelength of, for example, 1510 nm. The optical communication signal, on the other hand, contains one or more wavelengths in the range of, for example, 1532 nm to 1563 nm. For example, the optical communication signal is a wavelength-division multiplexed signal formed from one to forty waves.

The optical node 10 of FIG. 2 includes two amplifier units 11 and 13, an OADM unit 12, optical supervisors (hereafter "OSC") 14 and 15, and a control unit 16. This optical node 10 is configured as an OADM node using in-line amplifier units. The optical node 10 receives an optical communication signal from an adjacent optical node (not illustrated in FIG. 2), amplifies the received signal with an amplifier unit 11, applies add/drop processing to the amplified signal with an OADM unit 12, and transmits the resulting signal to the next optical node 30. The optical node 10 also receives an optical communication signal from the optical node 30, amplifies this received signal with another amplifier unit 13, applies add/drop processing to the amplified signal with the OADM unit 12, and transmits the resulting signal to a non-illustrated adjacent optical node.

The amplifier units 11 and 13, OADM unit 12, OSCs 14 and 15, and control unit 16 are each formed as a single module (e.g., mounted on a single board or substrate). For example, those modules are enclosed in a shelf to constitute an optical node 10.

The amplifier unit 11 includes two couplers 11a and 11c and an optical amplifier 11b. One coupler 11a is used to split off (or demultiplex) an incoming OSC signal from the optical communication signal received from the non-illustrated adjacent optical node. The split OSC signal is brought to the OSC 14, while the optical communication signal is supplied to the optical amplifier 11b. The coupler 11a may be, for example, a wavelength division multiplexing (WDM) coupler. The optical amplifier 11b amplifies the optical communication signal from the coupler 11a before supplying it to the OADM unit 12.

Another coupler 11c is used to combine an outgoing OSC signal from the OSC 14 with an outgoing optical communication signal from the OADM unit 12. This coupler 11c may be, for example, a WDM coupler. The amplifier unit 11 does not have an optical amplifier at the output end of the OADM 12d since the optical node 10 is built as an OADM node using in-line amplifier units. In other words, the amplifier unit 11 is an in-line amplifier unit.

The OADM unit 12 includes two OADMs 12a and 12d and two transponders (TRs) 12b and 12c. One OADM 12a receives a signal from one transponder 12c and adds it to an optical communication signal transmitted in one direction. Another OADM 12d receives a signal from the other transponder 12b and adds it to an optical communication signal transmitted in another direction. The OADMs 12a and 12d also drop signals from optical communication signals and supply them to a lower-level network (not illustrated). The transponders 12b and 12c supply the OADMs 12a and 12d with signals received from the lower-level network. Also the transponders 12b and 12c supply the lower-level network with signals dropped by the OADMs 12a and 12d.

The amplifier unit 13 includes two couplers 13a and 13c, a level controller 13b, an optical amplifier 13d, and a processor. One coupler 13a is used to combine an outgoing OSC signal produced by the OSC 15 with an outgoing optical communication signal from the OADM unit 12. This coupler 13a may be, for example, a WDM coupler. The amplifier unit 13 does not have an amplifier at the output end of the OADM 12a since the optical node 10 is built as an OADM node using in-line amplifier units.

The level controller 13b controls the power level of an OSC signal produced by the OSC 15. Specifically, the power level of an optical communication signal sent out of the OADM unit 12 is noticeably low, relative to the OSC signal produced by the OSC 15, because of the loss in the OADM 12a. In this case, the subsequent optical node 30 would need a high-performance demultiplexing filter or the like to remove (demultiplex) the OSC signal from the received optical communication signal, as will be discussed in detail later. To avoid this, the level controller 13b reduces the OSC signal level so as to equalize it to the per-wavelength power level of the optical communication signal. The optical node 30 can then demultiplex this OSC signal from the received optical communication signal by using an ordinary demultiplexing filter or other usual device.

Another coupler 13c splits an incoming OSC signal from the optical communication signal received from the optical node 30. The split OSC signal is brought to the OSC 15, while the optical communication signal is supplied to the optical amplifier 13d. This coupler 13c may be, for example, a WDM coupler. The optical amplifier 13d amplifies the optical communication signal from the coupler 13c and supplies it to the OADM unit 12.

The OSC 14 performs control operation based on an incoming OSC signal split from an optical communication signal at the coupler 11a. The OSC 14 also sends an outgoing OSC signal to the coupler 11c, which carries information on the optical node 10 itself and other information received from the optical node 30. Similarly, the OSC 15 sends an outgoing OSC signal to the coupler 13a, which carries information on the optical node 10 itself and other information received from the optical node 30. The OSC 15 also performs control operation based on an incoming OSC signal split from an optical communication signal at the coupler 13c.

The control unit 16 controls the optical node in its entirety, including the amplifier units 11 and 13, OADM unit 12, and OSCs 14 and 15.

The illustrated optical node 30 includes an amplifier unit 31 and an OSC 32. More specifically, the amplifier unit 31 includes two couplers 31a and 31c and an optical amplifier 31b. The amplifier unit 31 is not described in detail here because of its similarity to the foregoing amplifier unit 11 in the optical node 10. Also the OSC 32 is not described in detail here because of its similarity to the foregoing the OSC 14 in the optical node 10.

The optical node 30 may be an OADM node with post-amplifiers, or an in-line optical node, or an OADM node using in-line amplifier units. In the case that it is an OADM node with post-amplifiers, the optical node 30 has an optical amplifier before the coupler 31c. The optical node 30 also includes an OADM unit, OSC, and a control unit similarly to the optical node 10. In addition, the optical node 30 further includes an amplifier unit similar to the amplifier unit 13 discussed in FIG. 2. This amplifier unit is actually a modified version of the amplifier unit 13, in which another optical amplifier is added before the coupler 13a. In the case that it is an OADM node using in-line amplifier units, the optical node 30 further includes an OADM unit 12, an amplifier unit 13, OSCs 14 and 15, and a control unit 16 similarly to the optical node 10. In the case that it is an in-line optical node, the optical node 30 includes an amplifier unit 13, an OSC 15, and a control unit 16 similarly to the optical node 10, but no OADM unit unlike the OADM node using in-line amplifier units mentioned above.

Figure 3:
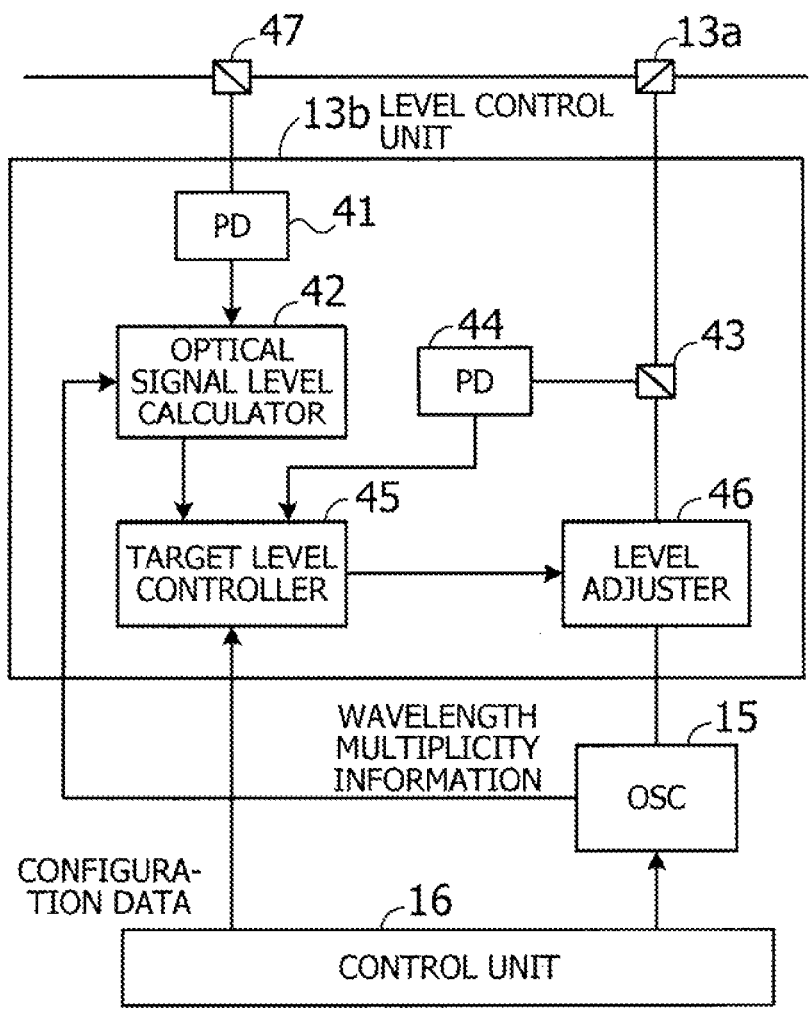
FIG. 3 is a block diagram of a level control unit.

FIG. 3 is a block diagram of a level control unit. The illustrated level controller 13b is formed from photo diodes (PD) 41 and 44, an optical signal level calculator 42, a coupler 43, a target level controller 45, and a level adjuster 46. Illustrated together with the level controller 13b are the coupler 13a, OSC 15, and control unit 16, which have been discussed in FIG. 2. FIG. 3 also depicts a coupler 47, which is not seen in FIG. 2.

The coupler 47, placed at the output of the OADM unit 12, splits a part of the outgoing optical communication signal and supplies it to a PD 41. The PD 41 converts the received optical communication signal into an electric signal representing its optical power level. The resulting electric signal is routed to the optical signal level calculator 42. The optical signal level calculator 42 also receives wavelength multiplicity information from the OSC 15. Based on this wavelength multiplicity information and the optical communication signal from PD 41, the optical signal level calculator 42 calculates a per-wavelength optical signal level, i.e., the power level of the optical communication signal per channel. Optical communication signals transmitted over the network are multi-wavelength signals each carrying multiple data channels, and the wavelength multiplicity information indicates the number of wavelengths multiplexed on an optical communication signal that is manipulated in the optical node 10. The OSC 15 receives this information from the control unit 16 and forwards it to the optical signal level calculator 42.

The coupler 43 splits a part of an OSC signal produced by the level adjuster 46 and supplies it a PD 44. The PD44 converts the received OSC signal into an electric signal representing its optical power level. The resulting electric signal goes to the target level controller 45. The target level controller 45 also receives configuration data from the control unit 16. This configuration data indicates, for example, whether the optical node 10 is an in-line optical node or an OADM node using in-line amplifier units. For example, the optical node 10 illustrated in FIG. 2 is an OADM node using in-line amplifier units, and the configuration data indicates this fact to the target level controller 45.

When the configuration data received from the control unit 16 indicates the optical node as being an OADM node using in-line amplifier units, the target level controller 45 controls the level adjuster 46 based on the per-wavelength optical signal level and the OSC signal level, which are provided from the optical signal level calculator 42 and PD 44, respectively. More specifically, the target level controller 45 controls the level adjuster 46 by using a feedback of the OSC signal appearing at the output of the level adjuster 46 in such a way that the power level of this output OSC signal will be equal to the given per-wavelength optical signal level. Under this feedback control by the target level controller 45, the level adjuster 46 varies the level of the OSC signal from the OSC 15.

That is, the level adjuster 46 outputs an OSC signal, whose intensity is observed as an output signal of the PD44. The target level controller 45 controls the level of this OSC signal such that it is equalized to the per-wavelength optical signal level calculated by the optical signal level calculator 42. As a result of this control action, the OSC signal delivered to the coupler 13a has a power level close to that of the optical communication signal in per wavelength terms, however the latter is reduced by the OADM unit 12.

As mentioned above, the constituent elements of the optical node 10 are modularized. This modular design allows the optical node 10 of FIG. 2 to transform itself into a different type of optical node if necessary. For example, by removing the OADM unit 12, the optical node 10 becomes an in-line optical node. Then the control unit 16 sends the target level controller 45 configuration data indicating that the node is configured as an in-line optical node. With this configuration data, the target level controller 45 disables the power level adjustment, allowing the OSC signal to stay at its original intensity. Being an in-line optical node, the optical node 10 is free from signal attenuation that could be caused by an OADM unit. This means that the level of the OSC signal from the OSC 15 is not so different from the per-wavelength optical signal level, and the OSC signal can be supplied straight to the coupler 13a. In other words, the difference is small enough for the receiving optical node 30 to operate properly without the need for high-performance demultiplexing filters. It is noted here that the OSC 15 is supposed to output an OSC signal at an appropriate optical power level adjusted so as to enable the subsequent optical node 30 to separate the OSC signal from a received optical communication signal by using a usual method.

As can be seen from the above description, the proposed optical node 10 controls OSC signal levels, so that the receiving optical node 30 is saved from the cost of introducing high performance demultiplexing filters. Also the proposed level controller 13b controls OSC signal levels based on given configuration data. The amplifier unit 13 can thus be used in both an OADM node using in-line amplifier units (where the level controller 13b is activated) and an in-line optical nodes (where the level controller 13b is deactivated). This feature also contributes to cost reduction since it solves the problem of manufacturing two different amplifier units for different types of optical nodes. The proposed amplifier unit 13 can be used commonly in the above-noted two types of optical nodes, i.e., OADM node using in-line amplifier units and in-line optical node, thus facilitating the user to handle those units. For example, the user need not worry about the compatibility of amplifier units for different types of optical nodes.

Referring to FIGS. 4 to 7, the next section will present examples of optical node designs that do not include the above-described level controller 13b. The example optical nodes include an OADM node using in-line amplifier units. The following description will discuss why this OADM node necessitates a downstream optical node to employ high-performance demultiplexing filters. The following description also treat modularized design of optical nodes.

Figure 4:
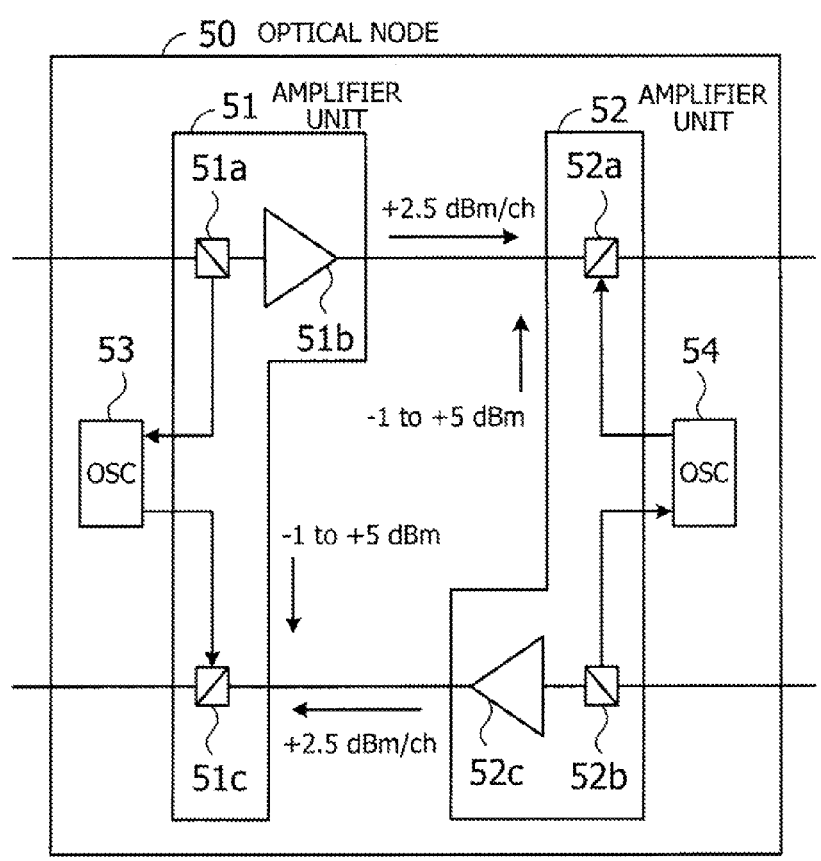
FIG. 4 illustrates an in-line optical node.

FIG. 4 illustrates an in-line optical node. The illustrated optical node 50 includes two amplifier units 51 and 52 and two OSCs 53 and 54. One amplifier unit 51 includes couplers 51a and 51c and an optical amplifier 51b. Similarly, the other amplifier unit 52 includes couplers 52a and 52b and an optical amplifier 52c. Those amplifier units 51 and 52 are not described in detail here because of their similarity to the amplifier unit 11 discussed in FIG. 2. Also the OSCs 53 and 54 are not described in detail here because of their similarity to the OSCs 14 and 15 discussed in FIG. 2. It is noted that the optical node of FIG. 4 has no OADM units since it is an in-line optical node. The optical node 50 also omits post-amplifiers since in-line optical nodes assume the use in short-haul communication.

In operation, the optical amplifiers 51b and 52c boost optical communication signals up to, for example, +2.5 dBm/ch, where "/ch" denotes "per channel" or "per wavelength." OSCs 54 and 53, on the other hand, produce OSC signals with a power level of, for example, −1 to +5 dBm, which is not much different from the level of optical communication signals per wavelength and thus does not necessitate the receiving optical node to use a high-performance demultiplexing filter.

Figure 5:
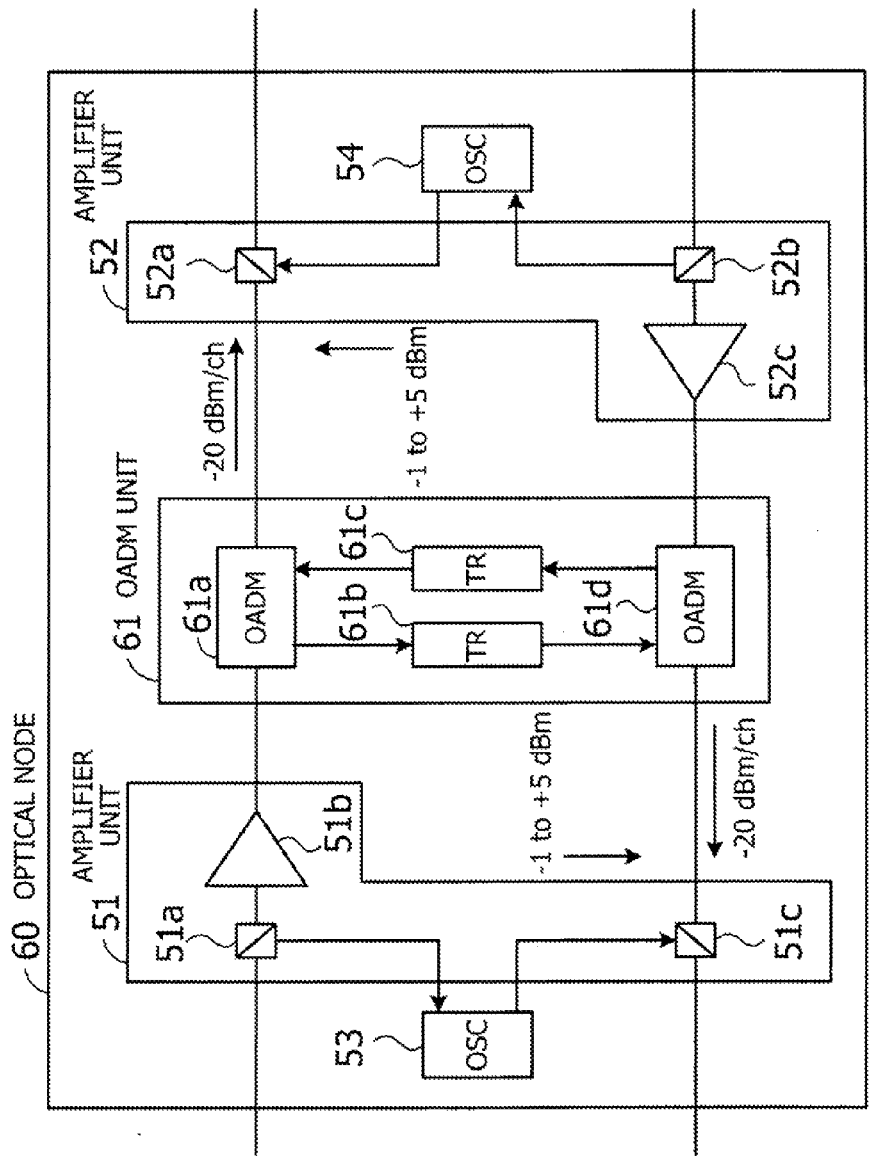
FIG. 5 illustrates an OADM node using in-line amplifier units.

FIG. 5 illustrates an OADM node using in-line amplifier units. The OADM node of FIG. 5 resembles the one discussed in FIG. 4. The following description will therefore focus on its distinctive points, while affixing like reference numerals to like elements.

The illustrated optical node 60 of FIG. 5 is an OADM node using in-line amplifier units. As can be seen from the comparison with FIG. 4, the optical node 60 is different from the foregoing in-line optical node 50 in the presence of an OADM unit 61. This OADM unit 61 is formed from two OADMs 61a and 61d and two transponders 61b and 61c. The OADM unit 61 is not described in detail here because of its similarity to the OADM unit 12 discussed in FIG. 2.

An incoming optical communication signal is amplified by the amplifier unit 51, but then loses its power level in the OADM unit 61. For example, the optical communication signal obtains a power level of +2.5 dBm/ch at the optical amplifier 51b. The OADM unit 61, however, reduces this to −20 dBm/ch as a result of its OADM processing. The OSC 54, on the other hand, produces an OSC signal of −1 to +5 dBm. The difference of this OSC signal from the optical communication signal amounts to at least 19 dBm.

Figure 6:
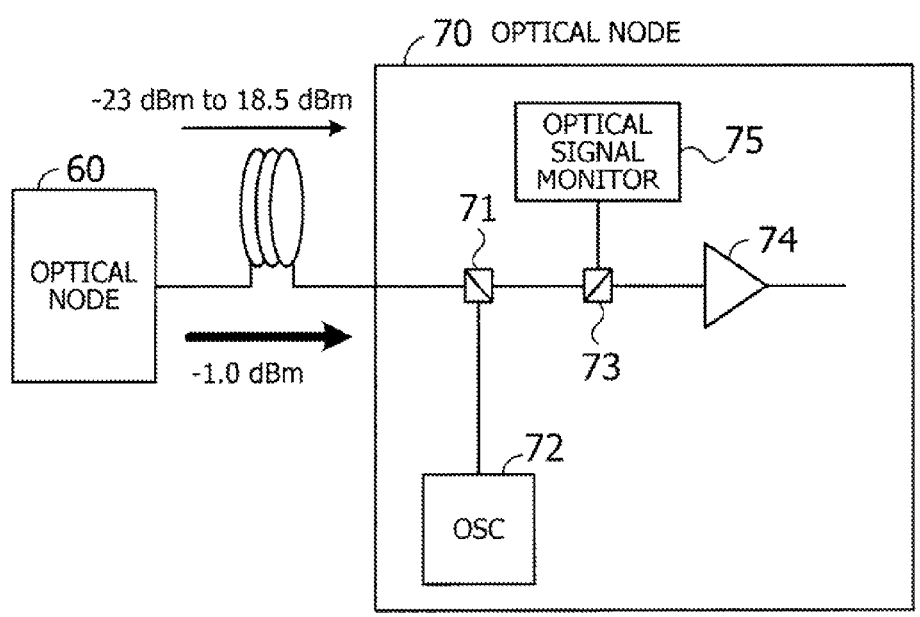
FIG. 6 illustrates an optical node connected to the OADM node using in-line amplifier units.

FIG. 6 illustrates an optical node connected to an OADM node using in-line amplifier units. FIG. 6 includes, in a simplified form, the same optical node 60 of FIG. 5, which is configured as an OADM node using in-line amplifier units. Another optical node 70 is connected downstream of the optical node 60 via a fiber-optic cable. This optical node 70 includes two couplers 71 and 73, an OSC 72, an optical amplifier 74, and an optical signal monitor 75. While some details are not depicted, the optical node 70 may be an OADM node with post-amplifiers, or an in-line optical node, or an OADM node using in-line amplifier units.

The front-end coupler 71 splits an OSC signal off from the optical communication signal received from the preceding optical node 60 and supplies that OSC signal to the OSC 72. The coupler 71 forwards the OSC-free optical communication signal to another coupler 73. Here the coupler 71 serves as a demultiplexing filter that separates the optical communication signal and OSC signal. The coupler 71 may be, for example, a WDM coupler.

The subsequent coupler 73 sends the above optical communication signal to the optical amplifier 74 while branching a part of that signal to the optical signal monitor 75. The optical amplifier 74 amplifies the optical communication signal supplied from the coupler 73 and outputs the amplified signal to subsequent optical circuits (not illustrated). The optical signal monitor 75 keeps track of the level of the optical communication signal branched from the coupler 73 to determine whether the communication link (optical fiber) is connected or disrupted.

Suppose now that the coupler 71 receives an optical communication signal with a total power level of −23.0 dBm to 18.5 dBm, together with an OSC signal with a power level of −1.0 dBm. As seen, the optical communication signal may vary significantly in the power level because its total power depends on how many wavelengths are multiplexed on that signal. For example, the optical signal level is −23.0 dBm when the signal carries only one wavelength channel. By contrast, the optical signal level amounts to 18.5 dBm when the signal carries its maximum number of wavelength channels (e.g., 40).

When the monitored level of the optical communication signal from the coupler 73 falls below a predetermined threshold, the optical signal monitor 75 detects it as a disruption of the communication link. Under the power level conditions assumed above, the optical signal monitor 75 sets its threshold to, for example, −26.0 dBm, which is safely below the minimum level (i.e., −23.0 dBm) of the optical communication signal.

Here the optical signal monitor 75 is supposed to detect an optical communication signal whose power level is around the threshold of −26.0 dBm. In order to achieve this with an error tolerance of ±0.1 dBm, the coupler 71 has to provide a suppression ratio of 41 dB or more for OSC signals with respect to the optical communication signal. Using a high-performance coupler to obtain such a high suppression ratio, however, leads to an increased cost of the optical node.

Another possible solution is to insert a demultiplexing filter between the coupler 73 and the optical signal monitor 75 to remove OSC signals, while using an ordinary coupler with a mediocre suppression ratio (e.g., 10 dB) in place of the above high-performance coupler 71. Even in this case, however, the additional demultiplexing filter has to be good enough to provide a suppression ratio of 30 dB. The problem of cost is not completely solved.

Figure 7:
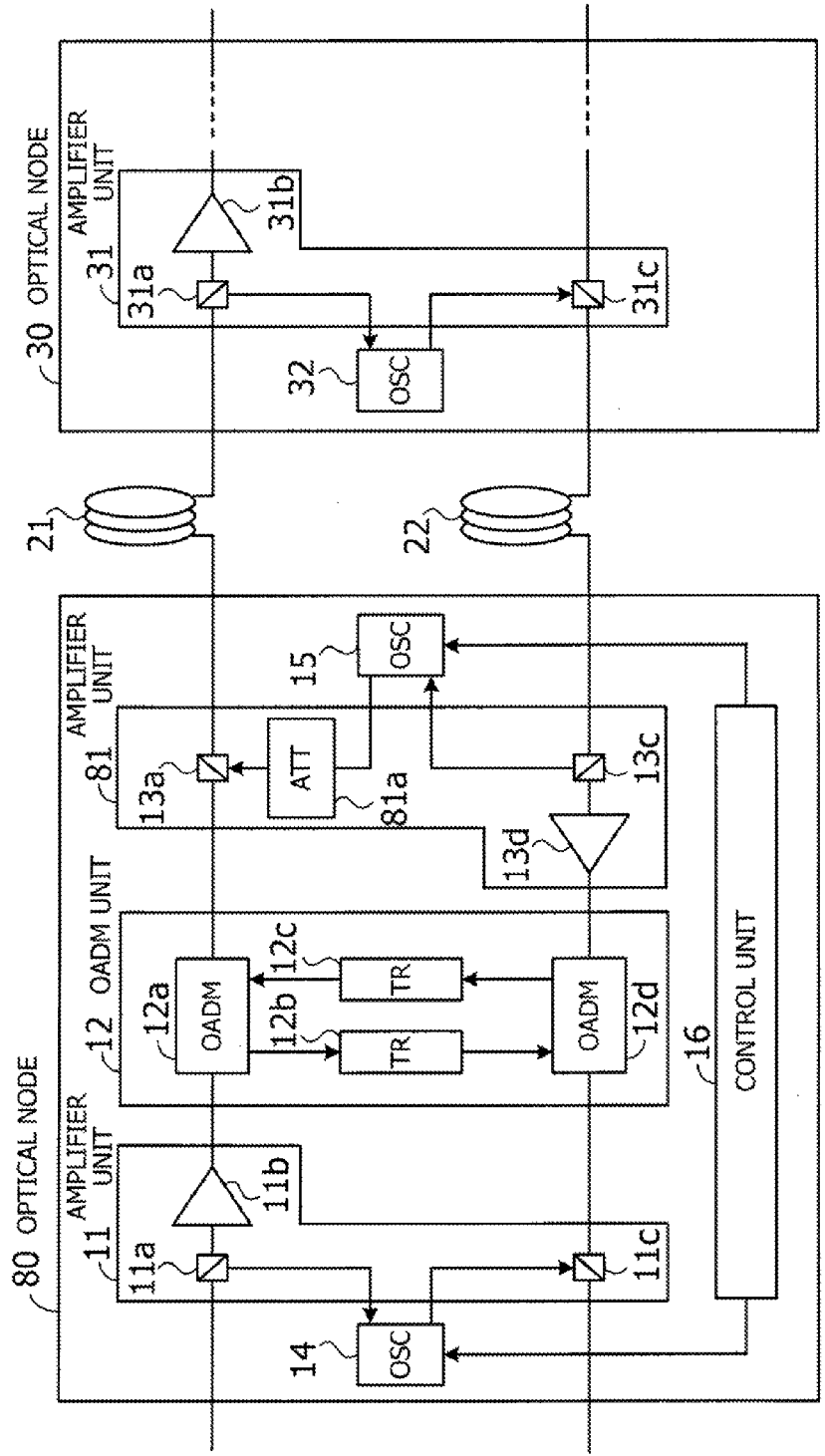
FIG. 7 illustrates an OADM node that uses an in-line amplifier unit including an optical attenuator.

FIG. 7 illustrates an OADM node that uses an in-line amplifier unit including an optical attenuator. This OADM node 80 of FIG. 7 shares several similar elements with the one discussed in FIG. 2, and those elements bear the same reference numerals. For their details, refer to the preceding description of FIG. 2. The optical node 80 of FIG. 7, however, has an amplifier unit 81 which is different from the amplifier unit 13 discussed in FIG. 7. Specifically, this amplifier unit 81 includes an attenuator (ATT) 81a in place of the level controller 13b in FIG. 2.

The attenuator 81a gives a fixed amount of attenuation on the OSC signal from the OSC 15 before it reaches the coupler 13a. The attenuation may be, for example, −20 dBm. Even though the optical signal level observed at the output end of the OADM unit 12 is as low as −23 dBm, its difference from OSC signal level is only 3 dBm because of the attenuator 81a. In this case, the downstream optical node 30 is allowed to use, for example, an ordinary coupler with a suppression ratio of 10 dBm as its front-end coupler 31a.

It is noted that the attenuator 81a only serves its purpose in OADM nodes using in-line amplifier units. This means that the vendor of optical nodes needs to provide two different types of amplifier units, one for in-line optical nodes and the other for OADM nodes using in-line amplifier units. For example, the vendor provides an amplifier unit 52 (FIG. 4) for in-line optical nodes, as well as an amplifier unit 81 (FIG. 7) for OADM nodes using in-line amplifier units. From the users' viewpoint, this situation means that they have to be aware of which amplifier unit is compatible with which type of optical nodes.

In contrast to the above, the amplifier unit 13 in FIG. 2 incorporates a level controller 13b that varies OSC signal levels in accordance with configuration data specified by a control unit 16. This single type of amplifier unit 13 can be applied to both in-line optical nodes and OADM nodes using in-line amplifier units.

Suppose, for example, that the amplifier unit 13 is mounted in an in-line optical node. The level controller 13b in the amplifier unit 13 then configures itself in accordance with configuration data from the control unit 16 so as not to attenuate the OSC signal. When, on the other hand, the amplifier unit 13 is mounted in an OADM node using in-line amplifier units, the level controller 13b configures itself in accordance with configuration data from the control unit 16 so as to attenuate the OSC signal.

Referring back to FIG. 2, the optical node 10 is an OADM node using in-line amplifier units. It is assumed that the OSC 15 outputs an OSC signal with a power level of −1 dBm, while the OADM unit 12 outputs an optical communication signal with a per-wavelength power level of −20 dBm. The level controller 13b forwards the OSC signal from the OSC 15 to the coupler 13a, adjusting its power level to −20 dBm.

Suppose now that the OADM unit 12 is removed from the optical node 10 of FIG. 2. The modified optical node 10 is now used as an in-line optical node. The amplifier unit 11 outputs an optical communication signal with a per-wavelength power level of +2.5 dBm. The level controller 13b has been configured not to vary the power level of given OSC signals. Thus the OSC signal of −1 dBm is simply forwarded from the OSC 15 to the coupler 13a without variation.

While in the above-described level controller 13b is designed to attenuate an OSC signal from the OSC 15, the embodiment may be modified such that the OSC signal is amplified at the level controller 13b. In this case, the OSC 15 is designed to output its OSC signal at −20 dBm, for example. When the optical node 10 is an OADM node using in-line amplifier units, the level controller 13b outputs the OSC signal without varying its power level. When the optical node 10 is an in-line optical node, the level controller 13b boosts the OSC signal up to −1 dBm.

It is also noted that the level controller 13b may be included not only in one amplifier unit 13 as in FIG. 2, but in the other amplifier unit 11 as well. Further, those amplifier units may incorporate OSCs.

A third embodiment will now be described below with reference to FIG. 8. The foregoing second embodiment implements feedback of OSC output for the level control unit to boost or reduce the OSC signal to a desired level. By contrast, the third embodiment described below does not use such OSC signal feedback in its power level control.

Figure 8:
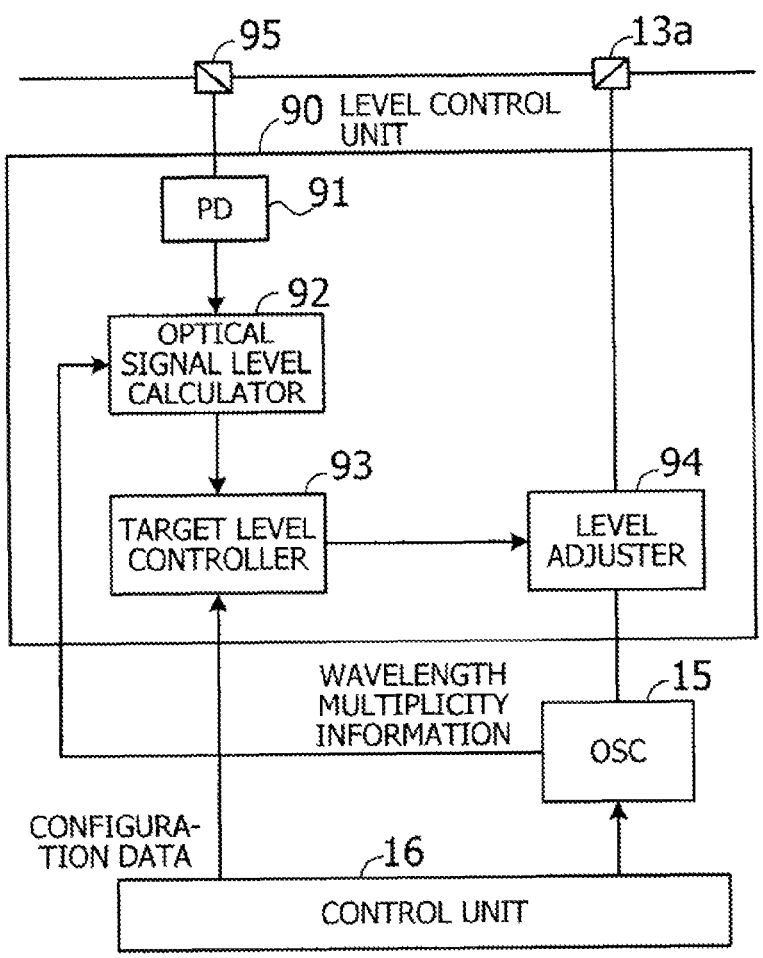
FIG. 8 is a block diagram of a level control unit according to a third embodiment.

FIG. 8 is a block diagram of a level control unit according to the third embodiment. The illustrated level control unit 90 includes a PD 91, an optical signal level calculator 92, a target level controller 93, and a level adjuster 94. FIG. 8 also depicts a coupler 13a, an OSC 15, and a control unit 16, which have been described in FIG. 2. FIG. 8 further depicts a coupler 95, which is omitted in FIG. 2. The PD 91, optical signal level calculator 92, level adjuster 94, and coupler 95 seen in FIG. 8 are similar to the PD 41, optical signal level calculator 42, level adjuster 46, and coupler 47 discussed in FIG. 3. Details of those elements are not described here.

The target level controller 93 receives configuration data from the control unit 16. When this configuration data indicates the optical node as being an OADM node using in-line amplifier units, the target level controller 93 controls the level adjuster 94 based on a per-wavelength optical signal level that has been calculated by the optical signal level calculator 92.

Specifically, the target level controller 93 is aware of how the voltage input to the level adjuster 94 affects the power level of an OSC signal that it outputs. For example, the target level controller 93 is coupled to a storage device or memory, which stores information that associates input voltages of the level adjuster 94 with output power levels of the same. When a per-wavelength optical signal level is given by the optical signal level calculator 92, the target level controller 93 consults the stored information with an observed power level of the optical communication signal, thereby obtaining its corresponding voltage. The target level controller 93 then outputs a signal with the obtained voltage to the level adjuster 94. The level adjuster 94 thus outputs an OSC signal whose power level is close to the given per-wavelength optical signal level.

The target level controller 93 also takes into account the configuration data from the control unit 16. That is, when the configuration data indicates in-line optical node, the target level controller 93 determines not to activate the level adjuster 94. Accordingly, the level adjuster 94 simply forwards the OSC signal from the OSC 15 to the coupler 13a.

As can be seen from the above description, the level control unit 90 of the third embodiment controls OSC signal levels without using feedback of actual power levels of the OSC signal entering the coupler 13a. The third embodiment thus eliminates the cost of feedback circuits.

A fourth embodiment will now be described below with reference to FIG. 9. In the foregoing second and third embodiments, the level control unit has a function of calculating a per-wavelength optical signal level based on wavelength multiplicity information. The fourth embodiment described below eliminates that function of calculating per-wavelength optical signal levels. Instead, the fourth embodiment controls OSC signal levels according to configuration data.

Figure 9:
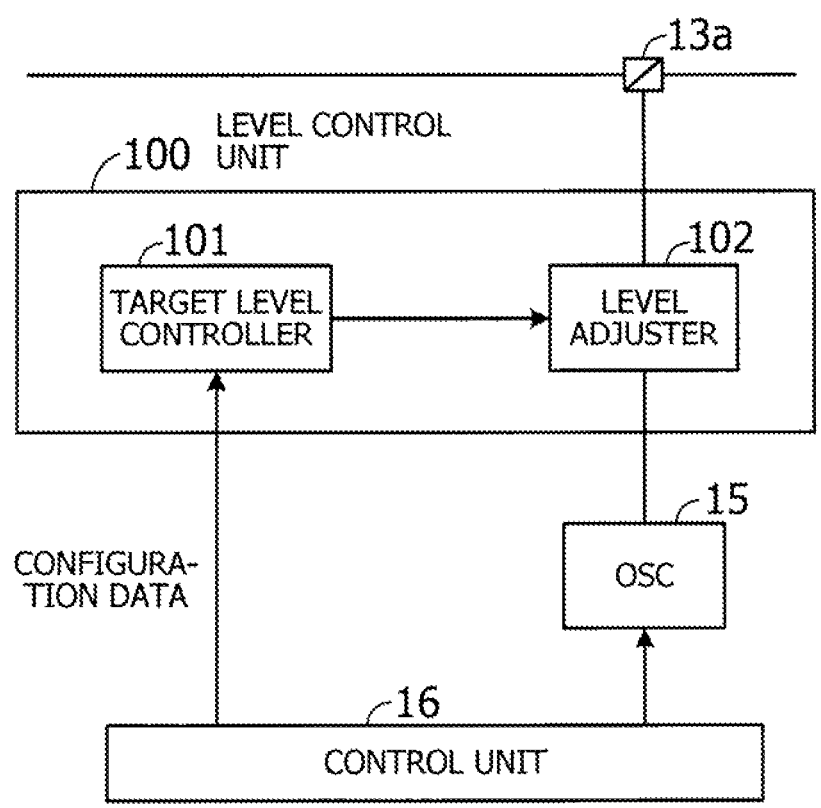
FIG. 9 is a block diagram of a level control unit according to a fourth embodiment.

FIG. 9 is a block diagram of a level control unit according to the fourth embodiment. The illustrated level control unit 100 includes a target level controller 101 and a level adjuster 102. FIG. 9 also depicts a coupler 13a, an OSC 15, and a control unit 16, which have already been described in FIG. 2.

The target level controller 101 receives configuration data from the control unit 16. The target level controller 101 is coupled to a storage device or memory, which stores a predefined value of per-wavelength power level of an optical communication signal entering the coupler 13a in the case that the node is an OADM node using in-line amplifier units. When configuration data given by the control unit 16 indicates that the node is an OADM node using in-line amplifier units, the target level controller 101 controls the level adjuster 102 in such a way that the OSC signal from the OSC 15 will be adjusted to the per-wavelength optical signal level stored in the storage device.

The per-wavelength power level of an optical communication signal entering the coupler 13a can previously be calculated at the time of design. With the above control, the OSC power level of the level adjuster 102 does not deviate so much from the per-wavelength power level of the optical communication signal entering the coupler 13a. In other words, their difference is small enough for the downstream optical node to operate properly without the need for high performance demultiplexing filters.

The target level controller 101 also takes into account configuration data from the control unit 16. That is, when the configuration data indicates in-line optical node, the target level controller 101 determines not to activate the level adjuster 102. Accordingly, the level adjuster 102 simply forwards the OSC signal from the OSC 15 to the coupler 13a.

The above-described level control unit 100 controls OSC signal levels based only on the configuration data from the control unit 16, without calculating per-wavelength optical signal levels from wavelength multiplicity information. The fourth embodiment thus makes it possible to eliminate the cost of implementing an optical signal level calculator.

A fifth embodiment will now be described below with reference to FIG. 10. In the foregoing second, third, and fourth embodiments, their level control unit relies on configuration data in determining whether to vary the OSC signal level. In contrast, the following fifth embodiment does not rely on the configuration data when controlling OSC signal levels.

Figure 10:
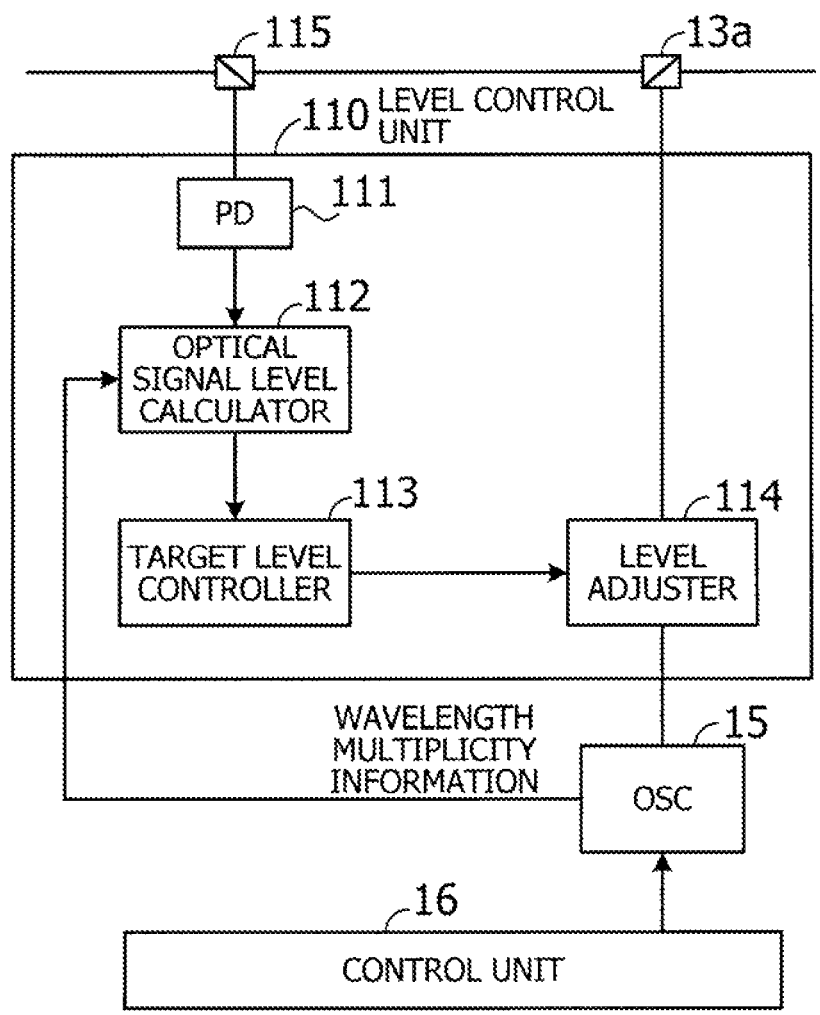
FIG. 10 is a block diagram of a level control unit according to a fifth embodiment.

FIG. 10 is a block diagram of a level control unit according to the fifth embodiment. The illustrated level control unit 110 includes a PD 111, an optical signal level calculator 112, a target level controller 113, and a level adjuster 114. FIG. 10 also depicts a coupler 13a, an OSC 15, and a control unit 16, which have already been described in FIG. 2. FIG. 10 further depicts a coupler 115, which is not seen in FIG. 2. The PD 111, optical signal level calculator 112, and level adjuster 114 are similar to the foregoing PD 41, optical signal level calculator 42, and level adjuster 46 in FIG. 3. Their details are not described here.

In operation, the target level controller 113 receives a per-wavelength optical signal level from the optical signal level calculator 112. Based on this per-wavelength optical signal level, the target level controller 113 controls OSC signal level adjustment at the level adjuster 114. Specifically, the target level controller 113 controls the level adjuster 114 such that the level adjuster 114 outputs an OSC signal to the coupler 13a with a power level that is equivalent to the per-wavelength optical signal level. To this end, the target level controller 113 has a storage device similar to that in the target level controller 93 discussed in FIG. 8. The target level controller 113 controls the OSC signal level by consulting the information in this storage device based on what the optical signal level calculator 112 indicates as a per-wavelength power level of the observed optical communication signal. The target level controller 113 controls the level adjuster 114 in such a way that the OSC signal is sent out at a power level that is equivalent to the per-wavelength optical signal level, whether the optical node is an in-line optical node or an OADM node using in-line amplifier units.

The above-described level control unit 110 does not rely on the configuration data in its control of OSC signal levels. The fifth embodiment, however, also saves the downstream node from increased costs by eliminating the need for high performance demultiplexing filters.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. An optical node comprising:
   a transmitter to produce an optical supervisory signal for supervising an optical network;
   a manager to manage first configuration information or second information, the first configuration information indicating that the optical node is an optical add-drop multiplexer node and has no post amplifiers, the second configuration information indicating that the optical node is not the optical add-drop multiplexer node and has no post amplifiers;
   a processor that is operative to perform control of a power level of the optical supervisory signal according to a per-wavelength power level of an optical communication signal in the case of recognizing the first configuration information, and to stop performing the control in the case of recognizing the second configuration information;
   a multiplexer to combine the optical supervisory signal after adjusting the power level by the processor with the optical communication signal to be transmitted to another optical node located downstream; and a storage to store information indicating a per-wavelength power level of the optical communication signal entering the multiplexer;

wherein the processor is operative to adjust the power level of the optical supervisory signal, and to control the adjusting such that the adjusted power level of the optical supervisory signal matches with the per-wavelength power level which is indicated by the information in the storage, when the optical node is an optical add-drop multiplexer node using in-line amplifiers.

2. The optical node according to claim 1, wherein the processor and the multiplexer are integrated into a single module.

3. The optical node according to claim 1, wherein the processor is operative to calculate the per-wavelength power level of the optical communication signal entering the multiplexer, to adjust the power level of the optical supervisory signal, to observe the power level of the adjusted optical supervisory signal, and to control the adjusting based on the power level of the observed optical supervisory signal such that the adjusted power level of the optical supervisory signal matches with the calculated per-wavelength power level, when the optical node is an optical add-drop multiplexer node using in-line amplifiers.

4. The optical node according to claim 1, wherein the processor is operative to calculate the per-wavelength power level of the optical communication signal entering the multiplexer, to adjust the power level of the optical supervisory signal, and to control the adjusting such that the adjusted power level of the optical supervisory signal matches with the calculated per-wavelength power level, when the optical node is an optical add-drop multiplexer node using in-line amplifiers.

5. The optical node according to claim 1, wherein the processor is operative to calculate the per-wavelength power level of the optical communication signal entering the multiplexer, to adjust the power level of the optical supervisory signal, and to control the adjusting such that the adjusted power level of the optical supervisory signal matches with the calculated per-wavelength power level.

6. An optical communication method for use in an optical node that transmits an optical communication signal, the optical communication method comprising:

producing, by a transmitter, an optical supervisory signal for supervising an optical network;

managing, by a manager, first configuration information or second information, the first configuration information indicating that the optical node is an optical add-drop multiplexer node and has no post amplifiers, the second configuration information indicating that the optical node is not the optical add-drop multiplexer node and has no post amplifiers;

performing, by a processor, control of a power level of the optical supervisory signal according to a per-wavelength power level of an optical communication signal in the case of recognizing the first configuration information and stopping performing the control in the case of recognizing the second configuration information;

combining, by a multiplexer, the optical supervisory signal after adjusting the power level by the processor with the optical communication signal to be transmitted to another optical node located downstream; and storing, by a storage, information indicating a per-wavelength power level of the optical communication signal entering the multiplexer;

wherein the processor is operative to adjust the power level of the optical supervisory signal, and to control the adjusting such that the adjusted power level of the optical supervisory signal matches with the per-wavelength power level which is indicated by the information in the storage, when the optical node is an optical add-drop multiplexer node using in-line amplifiers.

* * * * *